United States Patent
Jeong et al.

(10) Patent No.: US 10,756,367 B2
(45) Date of Patent: Aug. 25, 2020

(54) FUEL CELL FAILURE DIAGNOSTIC APPARATUS AND METHOD THEREOF

(71) Applicants: Hyundai Motor Company, Seoul (KR); Kia Motors Corporation, Seoul (KR)

(72) Inventors: Seong-Cheol Jeong, Gyeonggi-do (KR); Dae-Jong Kim, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 27 days.

(21) Appl. No.: 16/186,117

(22) Filed: Nov. 9, 2018

(65) Prior Publication Data

US 2019/0190043 A1    Jun. 20, 2019

(30) Foreign Application Priority Data

Dec. 19, 2017 (KR) .......................... 10-2017-0175309

(51) Int. Cl.
| | | |
|---|---|---|
| H01M 8/04 | (2016.01) | |
| H01M 8/04291 | (2016.01) | |
| H01M 8/04828 | (2016.01) | |
| H01M 8/04089 | (2016.01) | |
| H01M 8/04492 | (2016.01) | |

(52) U.S. Cl.
CPC ... *H01M 8/04291* (2013.01); *H01M 8/04097* (2013.01); *H01M 8/04514* (2013.01); *H01M 8/04843* (2013.01); *H01M 2250/20* (2013.01)

(58) Field of Classification Search
CPC ...................... H01M 8/04156; H01M 8/04291
See application file for complete search history.

(56) References Cited

U.S. PATENT DOCUMENTS

2010/0040913 A1*  2/2010  Son ..................... H01M 8/0444
                                                        429/492

FOREIGN PATENT DOCUMENTS

| KR | 10-2003-0095350 A | 12/2003 |
|---|---|---|
| KR | 10-1610534 B1 | 4/2016 |
| KR | 10-2016-0061460 A | 8/2016 |

* cited by examiner

*Primary Examiner* — Olatunji A Godo
(74) *Attorney, Agent, or Firm* — Mintz Levin Cohn Ferris Glovsky and Popeo, P.C.; Peter F. Corless (57) ABSTRACT

A fuel cell failure diagnostic apparatus is provided. The apparatus includes a water-level sensor that senses a water-level of water generated at an anode side of a fuel cell stack and stored in a water trap and a drain valve for the drain control of the generated water. A drain valve position sensor senses a position of the drain valve. A controller detects a failure situation by performing failure diagnosis based on the sensing information generated from the water-level sensor and the drain valve position sensor, and performs a corresponding control depending upon the failure situation.

19 Claims, 4 Drawing Sheets

FUEL CELL FAILURE DIAGNOSTIC APPARATUS AND METHOD THEREOF

CROSS-REFERENCE(S) TO RELATED APPLICATIONS

This application claims priority to Korean Patent Application No. 10-2017-0175309 filed on Dec. 19, 2017, which is incorporated herein by reference in its entirety.

BACKGROUND

Field of the Disclosure

The present disclosure relates to a fuel cell technology, and more particularly, to a fuel cell failure diagnostic apparatus and a method thereof, which perform failure diagnosis related with the discharge of fuel cell hydrogen.

Description of Related Art

Hydrogen used as a fuel in a fuel cell system is being actively developed as a fuel for a next generation system in terms of high efficiency and being eco-friendly compared to the conventional fossil fuel. However, there is a high risk of hydrogen leakage. Accordingly, the hydrogen discharge-related diagnosis in the fuel cell system is a fundamental and essential element for vehicle safety and efficiency enhancement/durability.

In particular, the safety risk upon leakage and the impossibility to obtain hydrogen concentration upon the impossibility of purge cause the reduction in efficiency/durability. Although the failure diagnosis for hydrogen discharge-related sensor and/or actuator is generally performed, the diagnostic range is very limited. In addition, due to the limited diagnostic range, the failure situation is unable to be specified and the operation is restricted by conservative control (e.g., shut-down) with the hydrogen-related safety issue. Accordingly, a diagnostic technology capable of more accurately specifying failure is required.

The contents described in this section are to help the understanding of the background of the present disclosure, and may include what is not previously known to those skilled in the art to which the present disclosure pertains.

SUMMARY

The present disclosure provides a fuel cell failure diagnostic apparatus and a method thereof, capable of specifying failure situations by expanding hydrogen discharge-related diagnostic range and using the result for a control depending upon the situation in a fuel cell system.

In addition, another object of the present disclosure is to provide a fuel cell failure diagnostic apparatus and a method thereof, which may perform an emergency operation and/or fail-safe considering the seriousness of failure to secure hydrogen safety strategy. In addition, another further object of the present disclosure is to provide a fuel cell failure diagnostic apparatus and a method thereof, which may mitigate an excessive shut-down and enhance the drivability. For achieving the objects, the present disclosure provides a fuel cell failure diagnostic apparatus and a method thereof, which may specify failure situations by expanding hydrogen discharge-related diagnostic range and use the result for a control depending upon the situation in a fuel cell system.

According to one aspect, the fuel cell failure diagnostic apparatus may include a water-level sensor configured to sense a water-level of water generated at an anode side of a fuel cell stack and stored in a water trap; a drain valve for drain control of the generated water; a drain valve position sensor configured to sense a position of the drain valve; and a controller configured to specify or determine a failure situation by performing failure diagnosis based on the sensing information generated from the water-level sensor and the drain valve position sensor, and perform a corresponding control depending upon the failure situation.

In particular, the failure diagnosis may be any one of a water-level non-increased error diagnosis of the generated water, a water-level out-of-normal range diagnosis of the generated water, a drain valve opening error diagnosis, a drain valve closing error diagnosis, and a drain valve position sensor opening error diagnosis. In addition, the water-level non-increased error diagnosis may determine a failure of the water-level sensor depending upon the increase of the water-level using a first current integrated value calculated by integrating a water-level sensor value of the water-level sensor, and perform considering at least one of fuel cell stack temperature and fuel cell stack current when calculating the first current integrated value.

The fuel cell stack temperature may be an inlet temperature or an outlet temperature of the fuel cell stack. The water-level out-of-normal range diagnosis of the generated water may determine the water-level out-of-normal range of the generated water based on whether the water-level sensor value is less than or greater than a specific value and the first current integrated value is maintained greater than a particular period of time.

When the first current integrated value is a first setting integrated reference value or greater and the water-level sensor value is maintained at a first specific value or greater for a first particular period of time, or the water-level sensor value is a second specific value or less and the first current integrated value is maintained at a second setting integrated reference value or greater for a second particular period of time, the controller may be configured to perform a drain control by opening the drain valve based on the second current integrated value that the water-level sensor value is integrated from upon operation of the fuel cell.

In addition, the drain valve opening error diagnosis may determine a failure when the water-level of the generated water does not reduce within a particular period of time after a valve opening command, and the closed state on the drain valve position sensor may be maintained for a particular period of time. When the opening of the drain valve fails, a current restriction control, a drain operation control based on the current integrated value, and an operation temperature upward control of the fuel cell stack may be performed to make operation possible while preventing the generated water from being accumulated.

Further, the drain valve closing error diagnosis may determine a failure when the water-level of the generated water is maintained at a setting reference value or less within a particular period of time after a valve closing command, and the opened state on the drain valve position sensor is maintained for a particular period of time. When the closing of the drain valve fails, a system shut-down control may be performed to prevent hydrogen leakage.

The drain valve position sensor opening error diagnosis may determine a failure when the water-level reduction of the generated water is sensed, but the opened state on the drain valve position sensor is maintained during opening of the drain valve. When the opening of the drain valve position sensor fails, the controller may be configured to perform a normal operation control. In addition, when the opening of the drain valve position sensor fails, the controller may be configured to indicate a user alarm.

When the opening of the drain valve position sensor fails, the controller may be configured to generate a failure code for maintenance separately. The fuel cell failure diagnostic apparatus may include a hydrogen purge valve for hydrogen concentration maintenance control of the fuel cell stack, and the controller may be configured to perform a purge control using the drain valve when the hydrogen purge valve is not always closed or is unable to be opened.

In addition, the controller may be configured to increase operation temperature and perform a normal operation control when the drain valve is not always closed. The controller may be configured to perform a normal operation control when the drain valve position sensor has any one of the disconnection failure of the sensor power supply, the short-circuit failure of the sensor power supply, the disconnection failure of the sensor, and the short-circuit failure of the sensor.

Another exemplary embodiment of the present disclosure may provide a fuel cell failure diagnostic method including a water-level sensor configured to sense a water-level of water generated at an anode side of a fuel cell stack and stored in a water trap; a drain valve configured to perform a drain control for the generated water; a drain valve position sensor configured to sense a position of the drain valve; and a controller configured to specify or determine a failure situation by performing a failure diagnosis based on the sensing information generated from the water-level sensor and the drain valve position sensor, and perform a corresponding control depending upon the failure situation.

According to the present disclosure, it may be possible to expand hydrogen discharge-related diagnostic range and use the result for a control depending upon the situation in a fuel cell system. In addition, there is another effect that may perform an emergency operation and/or fail-safe considering the seriousness of failure items to secure hydrogen safety strategy.

In addition, there is further another effect that may perform the Rationality diagnosis for malfunction of hydrogen purge valve position sensor and the Rationality diagnosis for a drain valve opening and blocking operation error in addition to disconnection/short-circuit. The present disclosure may also apply safety assurance reaction upon hydrogen exposure risk through malfunction diagnosis in the situation that cannot secure the reliability of the sensor value and an additional Rationality diagnosis. In addition, the present disclosure may avoid an excessive shut-down by performing differential reactions considering the seriousness, and enhance the drivability.

BRIEF DESCRIPTION OF THE DRAWINGS

The above and other features of the present disclosure will now be described in detail with reference to certain exemplary embodiments thereof illustrated the accompanying drawings which are given hereinbelow by way of illustration only, and thus are not limitative of the present disclosure, and wherein.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Various modifications and various forms may be made in the present disclosure, so that specific exemplary embodiments are illustrated in the drawings and described in detail in the specification. It should be understood, however, that it is not intended to limit the present disclosure to the particular disclosed forms, but includes all modifications, equivalents, and alternatives falling within the sprit and technical scope of the present disclosure.

Like reference numerals are used for like elements in describing each drawing. The terms "first," "second," and the like can be used to illustrate various components, but the components should not be limited by the terms. The terms are used to differentiate one element from another. For example, a first component may be referred to as a second component, and similarly, the second component may be also referred to as the first component without departing from the scope of the present disclosure.

Unless otherwise defined, all terms including technical and scientific terms used herein have the same meaning as commonly understood by one of ordinary skill in the art to which the present disclosure belongs. It will be further understood that terms, such as those defined in commonly used dictionaries, should be additionally interpreted as having a meaning that is consistent with their meaning in the context of the relevant art, and will not be interpreted in an idealized or overly formal sense unless expressly so defined in the application.

Hereinafter, a fuel cell failure diagnostic apparatus and a method thereof in accordance with an exemplary embodiment of the present disclosure will be described in detail with reference to the accompanying drawings.

Figure 1A:
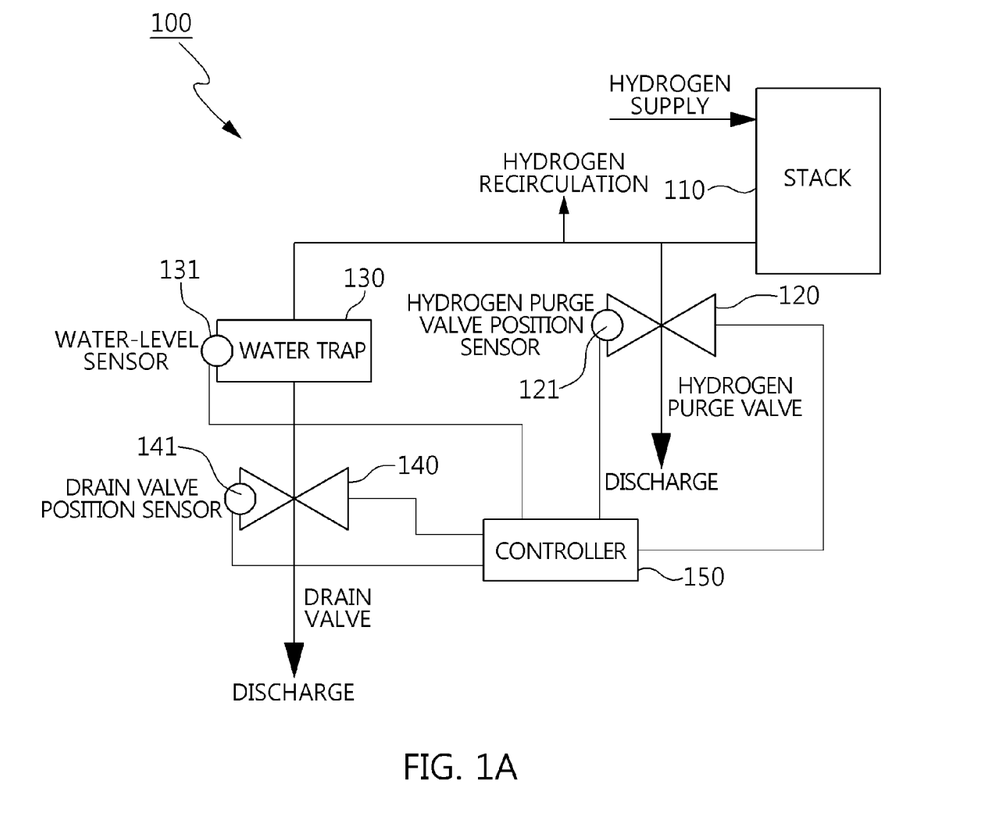
FIG. 1A is a configuration block diagram of a fuel cell failure diagnostic apparatus in accordance with an exemplary embodiment of the present disclosure.

FIG. 1A is a configuration block diagram of a fuel cell failure diagnostic apparatus 100 in accordance with an exemplary embodiment of the present disclosure. Referring to FIG. 1A, the fuel cell failure diagnostic apparatus 100 may include a fuel cell stack 110, a hydrogen purge valve 120 for hydrogen concentration maintenance control of the fuel cell stack 110, a hydrogen purge valve position sensor 121 configured to sense a position (an opened level) of the hydrogen purge valve 120, a water trap 130 configured to store water generated at an anode side of the fuel cell stack 110, a water-level sensor 131 configured to sense the water-level of the generated water stored in the water trap 130, a drain valve 140 for drain control for the generated water in the water trap 130, and a drain valve position sensor 141 configured to sense a position (an opened level) of the drain valve 140.

A controller 150 may be configured to specify, distinguish, or determine failure situations by performing a failure diagnosis based on the sensing information generated from the hydrogen purge valve sensor 121, the water-level sensor 131, and the drain valve position sensor 141, and perform a corresponding control depending upon the failure situations. The corresponding control may be the control based on the detected failure situation and may take into consideration the severity of the result thereof. An effective emergency operation and fail-safe may be performed depending upon this corresponding control. Accordingly, it may be possible to maximize the safety and driving range of a driver, thus maximizing the drivability. In other words, in the exemplary embodiment of the present disclosure, it may be possible to implement the strategy that mitigates the shut-down and to expand the driving range as well as that suggests a Rationality diagnosis.

Particularly, the controller 150 may be a vehicle control unit (VCU) installed inside a vehicle, and may be also configured separately. In FIG. 1A, a separate path for enhancing hydrogen use rate exists through hydrogen recirculation even after being used at an anode side. In addition, in the exemplary embodiment of the present disclosure, a supply system related to a hydrogen supply-related control will be omitted for a clear understanding of the present disclosure.

Figure 1B:
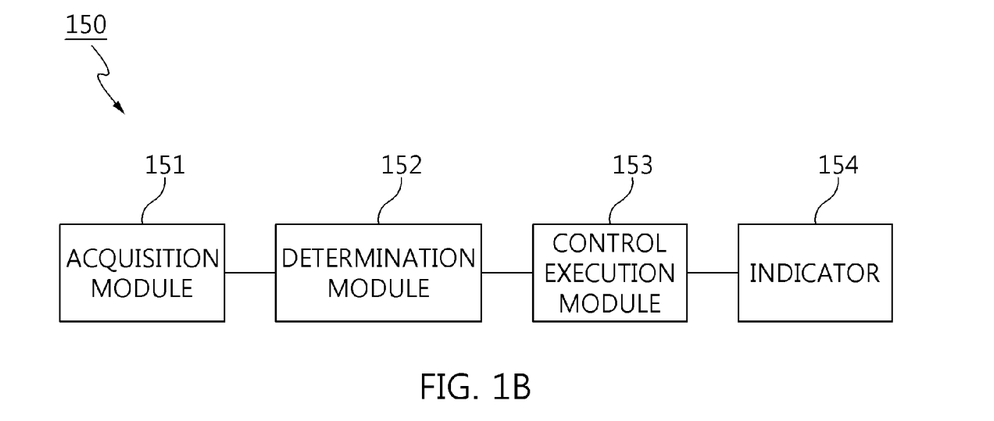
FIG. 1B is a detailed configuration block diagram of a controller illustrated in FIG. 1 in accordance with an exemplary embodiment of the present disclosure.

FIG. 1B is a detailed configuration block diagram of the controller illustrated in FIG. 1. Referring to FIG. 1B, the controller 150 may include an acquisition module 151 configured to acquire information from the hydrogen purge valve sensor 121, the sensing information generated from the water-level sensor 131 and the drain valve position sensor 141; a determination module 152 configured to detect and distinguish failure situations by performing a failure diagnosis using the sensing information; a control execution module 153 configured to perform a corresponding control depending upon the situations considering the severity of the specified failure situations; and an indicator 154 configured to display or output an alarm depending upon the corresponding control. The indicator 154 may be a lamp, a display, etc.

In addition, the terms of "the acquisition module," "the determination module," and "the control performing module" illustrated in FIGS. 1A and 1B refer to the unit processing at least one function or operation, and may be implemented by the connection of hardware and software. The hardware may be implemented by an Application Specific Integrated Circuit (ASIC) designed for performing the above function, a Digital Signal Processing (DSP), a Programmable Logic Device (PLD), a Field Programmable Gate Array (FPGA), a processor, a controller, a microprocessor, another electronic unit, or a combination thereof. The software may be implemented by a module performing the above functions. The software may be stored in a memory unit, and executed by a processor.

The items of the diagnosis/corresponding control (i.e., the reaction) may be summarized as Table 1 below.

TABLE 1

| Failure Object | Items of failure diagnosis and corresponding control | |
|---|---|---|
| | Failure situations | Corresponding control |
| Hydrogen purge valve | Always opening failure (regardless of command) | System shut-down |
| | Always closing failure (regardless of command) | Reaction: perform purge using drain valve (general technology: System shut-down) |
| | Impossibility of valve opening | Reaction: perform purge using drain valve (general technology: System shut-down) |
| | Impossibility of valve closing | System shut-down |
| Hydrogen purge valve position sensor | disconnection/short-circuit failure of sensor power supply | System shut-down |
| | disconnection/short-circuit failure of sensor | System shut-down |
| Water-level sensor | disconnection/short-circuit failure of sensor | System shut-down |
| | water-level non-reduced error | System shut-down |
| | water-level non-increased | misdiagnosis considering temperature and current |

TABLE 1-continued

| Failure Object | Items of failure diagnosis and corresponding control | |
|---|---|---|
| | Failure situations | Corresponding control |
| | error | upon calculating current integration |
| | Rationality diagnosis of water-level out-of-normal range | Perform drain based on current integration when water-level sensor value is maintained at a specific value or less for a certain time or more |
| Drain valve | Always opening failure (regardless of command) | System shut-down |
| | Always closing failure (regardless of command) | Reaction: perform operation temperature upward normal operation (general technology: system shut-down) |
| | Rationality diagnosis for valve opening error | During valve opening, when there is no reduction in water-level and the closed state on the position sensor is maintained, perform current limitation, purge using drain valve, and operation temperature upward normal operation |
| | Rationality diagnosis for valve closing error | During valve closing, when maintaining at water-level reference value or less and the opened display state on position sensor, perform system shut-down (in terms of safety) |
| Drain valve sensor | disconnection/short-circuit failure of sensor power supply | Reaction: perform normal operation (general technology: system shut-down) |
| | disconnection/short-circuit failure of sensor | Reaction: perform normal operation (general technology: system shut-down) |
| | Rationality diagnosis for position sensor opening error | During valve opening, when reduction in water-level is sensed but the opened state on position sensor is maintained (failure codes for maintenance are generated separately) |

Referring to Table 1, the diagnosis and corresponding control related with the hydrogen purge valve are as follows.

① Always opening failure (regardless of command): the situation where the always valve opening command is delivered, and is generally caused by the disconnection/short-circuit of a control command line. Since the valve performs the opening operation regardless of the command transmitted in the controller 150, the system shut-down may be performed due to a high risk of hydrogen leakage.

② Always closing failure (regardless of command): the situation where the always valve closing command is delivered, and is generally caused by the disconnection/short-circuit of a control command line. Since the valve performs the closing operation regardless of the command transmitted in the controller 150, the risk of hydrogen leakage is minimal. Accordingly, the system shut-down is unnecessary. Typically, in the related art, the system shut-down was performed. However, by performing the hydrogen purge using the drain valve by an emergency operation, the hydrogen concentration control may be performed.

③ Valve opening/closing Impossibility: the situation where the opening/closing command has been transmitted but an actual opening value is not the opened/closed state, and is generally generated by failure of the valve actuator. When the hydrogen purge valve 120 is in the opening command and maintains the closed state, the system shut-down is unnecessary due to a minimal risk of the hydrogen leakage.

However, by performing the hydrogen purge using the drain valve by an emergency operation, the hydrogen concentration control may be performed. However, in the situation where the valve is in the closing command and maintains the opened state, the system shut-down may be performed due to a high risk of the hydrogen leakage. The diagnosis may be determined when maintaining as a particular opening value or greater (or less) for a particular period of time. For example, in case of "Impossibility of valve opening" diagnosis, the opening value may be less than about 10° and the opened state may be maintained for about 60 ms. Additionally, in case of "Impossibility of valve closing" diagnosis, the opening value may be above about 80° and the closed state may be maintained for about 60 ms. A full opening value may be 80° and a full closing value may be 0°. Prior to this, the valve and the valve position sensor should be not disconnected/short-circuited.

Referring to Table 1, the diagnosis and corresponding control related with the hydrogen purge valve position sensor are as follows. Disconnection/short-circuit failure of sensor power supply and disconnection/short-circuit failure of sensor: these are caused by the power supply of the hydrogen purge valve position sensor 121 and the disconnection/short-circuit of the sensor. In particular, since the position of the hydrogen purge valve 120 is unknown, the system shut-down may be performed due to a high risk of hydrogen leakage.

Further, referring to Table 1, the diagnosis and corresponding control related with the water-level sensor are as follows.

① Disconnection/short-circuit of water-level sensor: caused by the disconnection/short-circuit of the water-level sensor (or the power supply). Since the amount of the generated water in the water trap 130 is unknown, the water-level-based drain is impossible. Accordingly, a drain emergency operation based on the current integrated value may be performed. In particular, the current integrated value and the opening time of the drain valve 140 may be set together in consideration of generated water discharge and hydrogen leakage.

② Water-level non-reduced error: a failure may be determined when the water-level within a particular period of time after the drain valve opening operation command is maintained as a particular level or greater for a particular period of time or greater. For example, the water-level may be maintained for about 200 ms with above about 53 mm within 3 s after the opening operation command. The water-level sensor 131 may be unreliably, and a drain emergency operation based on the current integrated value may be performed. In particular, the water-level monitoring time after the water-level reference value and the operation command may be set considering the discharge speed upon drain open.

③ Water-level non-increased error: a failure may be determined when there is no increase in the water level even though the current integrated value is a particular level or greater. A misdiagnosis may be minimized by considering temperature and current upon the current integration calculation. When the temperature is a predetermined temperature or greater, the water is in a liquid state and a phase change thereof is more difficult than at the low temperature, and when the current is not output at a particular value or greater, the integrated value is unintentionally increased by a sensor offset. For example, the water level may be maintained with less than 53 mm when the current integrated value may be about 11,000 C(Coulomb) in the closing operation command. The integration may be not executed above about 63° C. Upon confirmation of the diagnosis, since the water-level sensor may be unreliable, a drain emergency operation based on the current integrated value may be performed. Meanwhile, in a general method of the related art, the possibility of performing the misdiagnosis and the unnecessary reaction exists without considering temperature and/or current.

④ Rationality diagnosis for water-level out-of-normal range: a failure may be determined when the water-level sensor value is maintained at a particular value or less (or more) up to a certain value or greater of the current integrated value. The failure when the value equal to or less than a particular value of the sensor may indicate both the empty state and the full water state due to the characteristics of the water-level sensor. Upon occurrence of failure, assuming that the water is full, a drain emergency operation based on the current integrated value may be performed.

Figure 2:
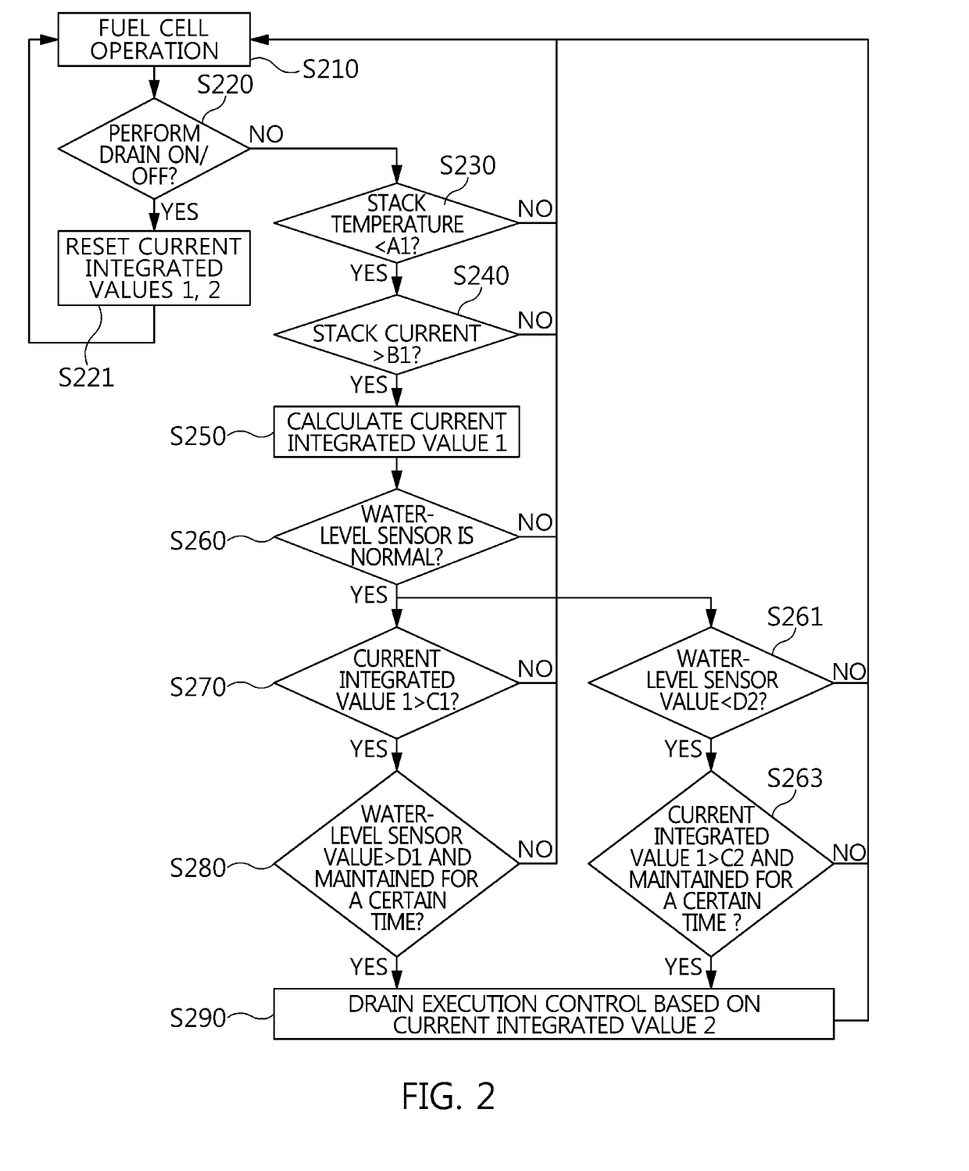
FIG. 2 is a flowchart illustrating a Rationality diagnosis and reaction procedure for a water-level non-increased error and a water-level out-of-normal range in accordance with the exemplary embodiment of the present disclosure.

FIG. 2 is a diagram illustrating a drain emergency operation procedure based on the current integrated value. The procedure described herein below may be executed by a controller. Referring to FIG. 2, whether ON/OFF of the drain valve 140 is performed during the operation of the fuel cell may be confirmed, and when the ON/OFF of the drain valve 140 is not performed, the current integrated values 1, 2 may be reset (S210, S220, S221). In the S220, when the ON/OFF of the drain valve 140 has not been performed, when the fuel cell stack temperature is less than a reference value (A1) and the fuel cell stack current is greater than a reference value (B1), the current integrated value 1 may be determined and whether the water-level sensor 131 is normal may be determined based on the value (S230, S240, S250, S260). The term normal herein refers to a state without a failure or malfunction. In particular, when calculating the current integrated value 1, the fuel cell stack temperature may use the inlet temperature or the outlet temperature of the fuel cell stack.

In addition, it may be possible to use only one of the fuel cell stack temperature and the fuel cell stack current when calculating the current integrated value 1, but the accuracy is higher when using both. A temperature sensor (not shown) and a current sensor (not shown) may be used to sense the fuel cell stack temperature and current. The temperature sensor and the current sensor may be configured separately, and also configured in the fuel cell stack.

In the S260, when the water-level is normal, when the current integrated value 1 is a particular value (C1) or greater and the water-level sensor value is maintained at a particular value (D1) for a predetermined period of time, the controller 150 may be configured to open the drain valve based on the current integrated value 2 to perform a drain control (S270, S280, S290). In particular, the current integrated value 2 may be the value calculated by integrating the sensor value from upon operating the fuel cell (S210).

In addition, in the S260, when the water-level is normal, when the water-level sensor value is maintained at a particular value (D2) or greater and the current integrated value 1 is maintained at a particular value (C2) or greater for a predetermined period of time, the controller 150 may be configured to open the drain value based on the current integrated value 2 to perform a drain control (S261, S263, S290). The normal status of the water-level sensor may be determined depending upon the disconnection/short-circuit of the sensor.

The current integrated values 1, 2 may be used separately or together. For a separate use, it may be possible to calculate the current integrated value 2 regardless of the stack temperature and current. In addition, upon the out-of-normal range Rationality diagnosis, the water-level value may be diagnosed at a particular level or greater, or less depending upon the characteristics of the sensor.

Referring to Table 1, the diagnosis and corresponding control related with the drain valve are as follows.

① Always opening failure (regardless of command): the situation where the always valve opening command is delivered, and is generally caused by the disconnection/short-circuit of a control command line. Since the drain valve 140 performs the opening operation regardless of the command transmitted in the controller 150, the risk of hydrogen leakage is substantial. Accordingly, the system shut-down may be performed.

② Always closing failure (regardless of command): the situation where the always valve closing command is delivered, and is generally caused by the disconnection/short-circuit of a control command line. Since the drain valve 140 performs the closing operation regardless of the command transmitted in the controller 150, the risk of hydrogen leakage is minimal. Accordingly, the system shut-down is unnecessary. However, a control may be performed that increases the fuel cell operation temperature by an emergency operation to perform a normal operation.

③ Rationality diagnosis for valve opening error: a failure may be determined when the water level does not reduce within a predetermined period of time after the valve opening command and the closed state on the position sensor is maintained for a predetermined period of time. For example, the water level may be reduced to less than about 10 mm after and before the opening within about 5 s after the opening command and the drain valve may be determined to be closed (e.g., about less than 10°). Since this failure is related to the opening of the drain valve 140 malfunctioning, the risk of hydrogen leakage is minimal and thus the system shut-down is unnecessary. However, when the opening is not normally performed, since the generated water continues to be accumulated, a current restriction control, a drain execution control based on the current integration, and an operation temperature upward control of the fuel cell stack may be performed to make operation possible while maximally reducing the generated water.

④ Rationality diagnosis for valve closing error: among the valve closing commands, a failure may be determined when the water level is maintained as a reference value or less and the opened state on the position sensor is maintained. For example, the water level may be reduced to less than about 8 mm in the closing command and the drain valve may be maintained for about 200 ms since it has been determined to be opened (e.g., about above 80°). This failure situation relates to the operation of the drain valve 140 being abnormal and thus, the drain valve 140 may be continuously opened, and the system shut-down may be performed due to a substantial risk of hydrogen leakage.

Figure 3:
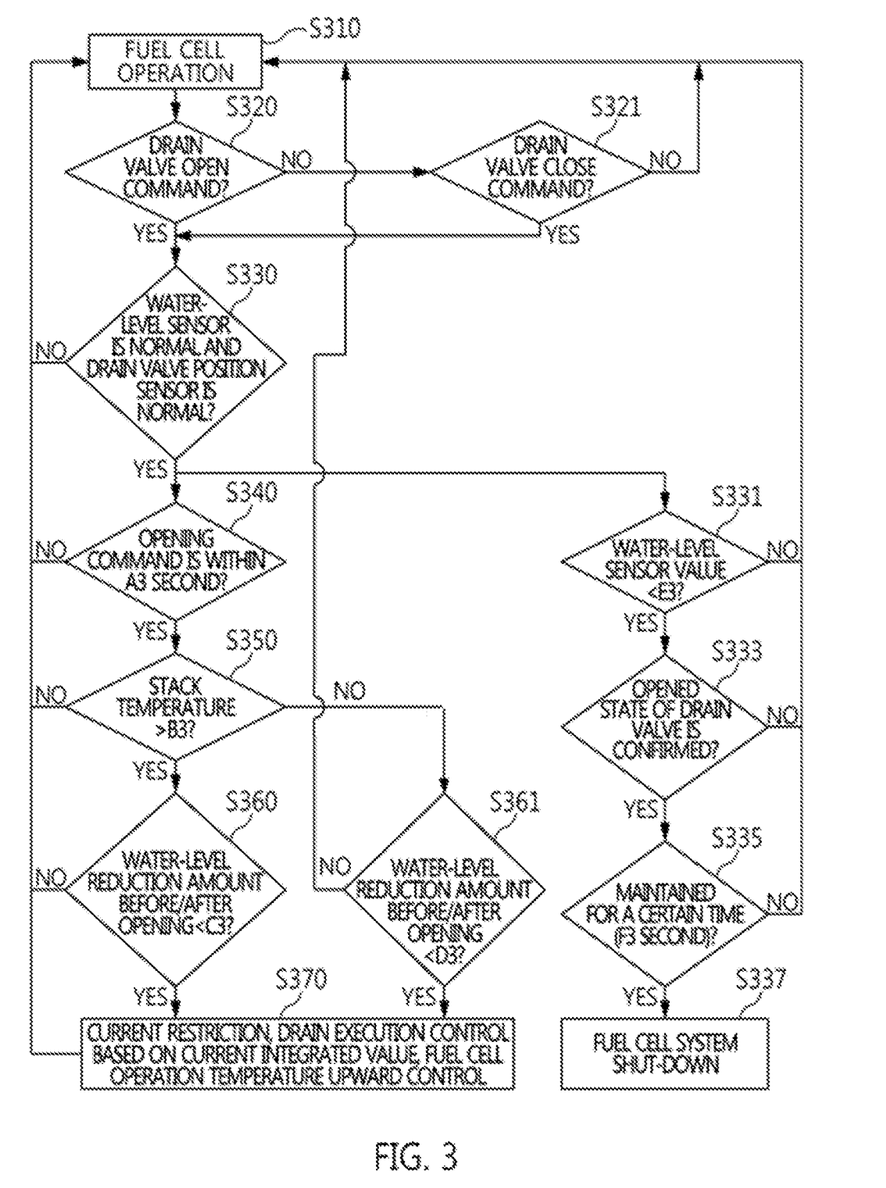
FIG. 3 is a flowchart illustrating a Rationality diagnosis and reaction procedure for a drain valve opening and closing error in accordance with the exemplary embodiment of the present disclosure.

A detailed procedure on the diagnosis and corresponding control related with the drain valve are illustrated in FIG. 3. FIG. 3 is a flowchart illustrating the drain valve opening and closing error Rationality diagnoses and reaction procedure in accordance with the exemplary embodiment of the present disclosure. Referring to FIG. 3, when the drain valve opening command is performed during the operation of the fuel cell, whether the water-level sensor is normal and the drain valve position sensor is normal may be determined (S310, S320, S330). The method described herein below may be executed by the controller.

Particularly, in the S330, as a result, when the water-level sensor and the drain valve position sensor are normal, when the opening command is within a predetermined period of time (A3 second), the fuel cell stack temperature is a setting value (B3) or greater, the reduction amount before/after opening is less than a setting value (C3), the controller may be configured to perform a drain execution control based on the current integrated value and the operation temperature upward control of the fuel cell stack (S340, S350, S360, S370).

In addition, in the S350, when the fuel cell stack temperature is less than the setting value (B3) and the water-level reduction amount before/after opening is less than the setting value (D3), the controller may be configured to perform the current restriction control, the drain execution control based on the current integrated value and the operation temperature upward control of the fuel cell stack (S350, S361, S370).

Further, when the drain valve closing command is performed, whether the water-level sensor is normal and the drain valve position sensor is normal may be determined (S321, S330). In the S330, as a result, when the water-level sensor and the drain valve position sensor are normal, when the water-level sensor value is less than a specific value (E3) and the drain valve is in the opened state, and the opened state is maintained for a predetermined period of time (F3 second), the controller may be configured to perform the system shut-down control (S331, S333, S335, S337).

Referring to Table 1, the diagnosis and corresponding control related with the drain valve position sensor are as follows.

① Disconnection/short-circuit of sensor power supply and sensor: the situation where the position of the drain valve 140 is unreliable and unable to monitor the state of actual valve. However, the opening diagnosis due to the disconnection/short-circuit of the drain valve itself exists separately, and the opening command and the reaction based on the current integrated value exist additionally not to require the reaction for the corresponding items. It may be possible to avoid an excessive reaction through the diagnosis for other items and the Rationality item compared to general shut-down reaction.

② Rationality diagnosis for position sensor opening error: among the valve opening commands, a failure may be determined when the reduction in a particular level or greater of the water level is sensed, but the opened state on the position sensor is maintained. Since the reaction based on the items of the opening diagnosis of the drain valve and the Rationality diagnosis based on the water-level sensor is possible like the items of the above disconnection/short-circuit, the reaction for the corresponding item is unnecessary. In the diagnosis related with the drain valve position sensor, since there is no separate vehicle reaction but is a problem with the sensor, it may be possible to provide a user a notification using a service lamp, etc. for vehicle maintenance.

Figure 4:
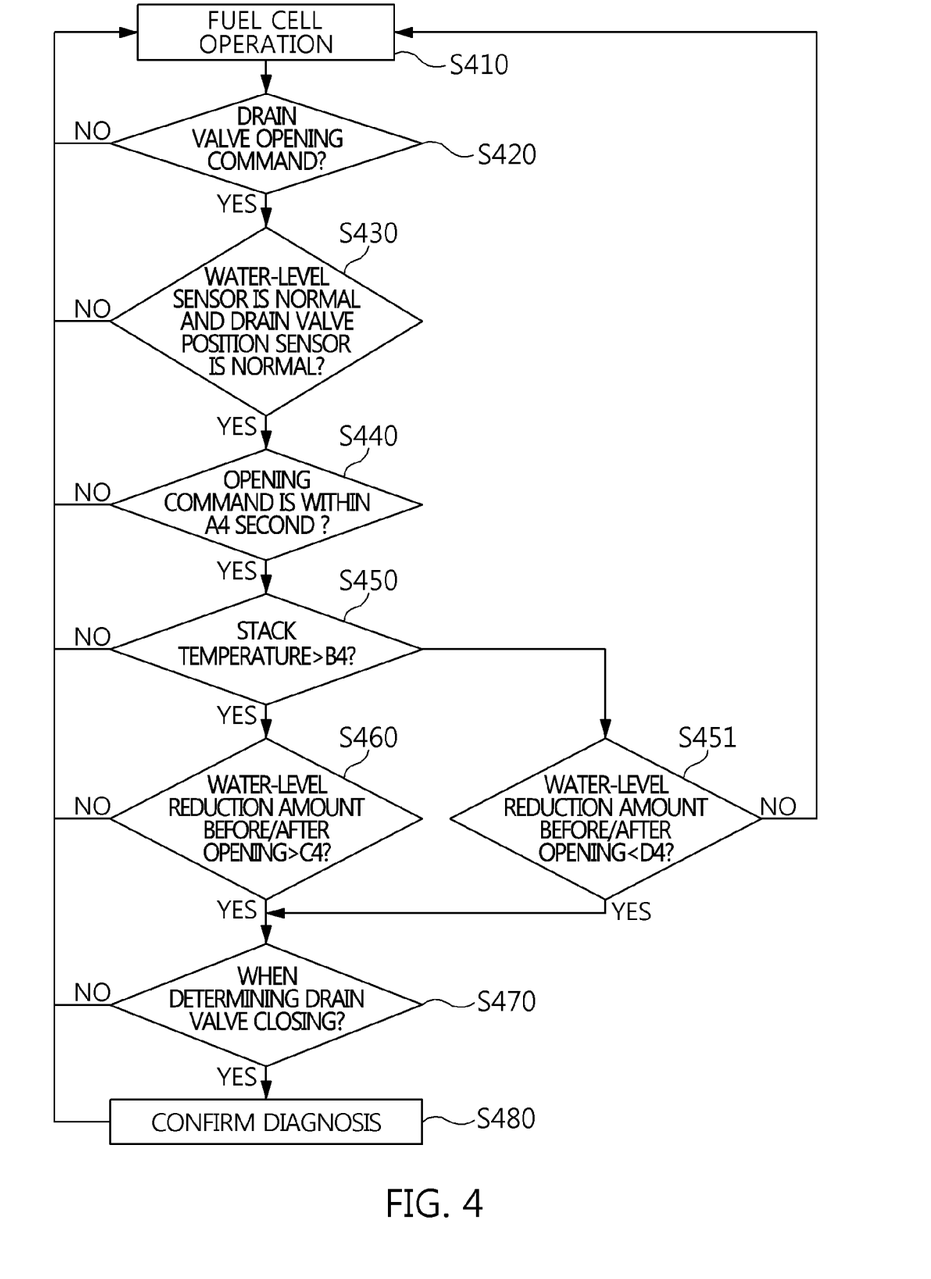
FIG. 4 is a flowchart illustrating a Rationality diagnosis and reaction procedure for a drain valve position sensor in accordance with the exemplary embodiment of the present disclosure.

FIG. 4 is a diagram illustrating the diagnosis and corresponding control related with the drain valve position sensor. FIG. 4 is a flowchart illustrating the Rationality diagnosis and reaction procedure for the drain valve position sensor in accordance with the exemplary embodiment of the present disclosure. Referring to FIG. 4, when the drain valve opening command is performed during the operation of the fuel cell, whether the water-level sensor is normal and the drain valve position sensor is normal may be confirmed (S410, S420, S430).

In the S430, as a result, when the water-level sensor and the drain valve position sensor are normal, in response to determining whether the opening command is within a predetermined period of time (A4 second), the fuel cell stack temperature is a setting value (B4) or greater, the water-level reduction amount before/after opening is greater than a setting value (C4), and the drain valve is closed, the controller may be configured to confirm the diagnosis as a failure (S440, S450, S460, S470, S480). In the S450, when the fuel cell stack temperature is less than the setting value (B4), in response to determining that the water-level reduction amount before/after opening is less than the setting value (D4) and the drain valve is closed, the controller may be configured to confirm the diagnosis as a failure (S451, S470, S480).

In addition, the steps of the method or the algorithm explained regarding the embodiments disclosed herein are implemented as a program command format that may be performed through various computers means to be recorded in a non-transitory computer readable medium. The non-transitory computer readable medium can include a program (command) code, a data file, a data structure, etc. separately or a combination thereof.

The program (command) code recorded in the medium can be the ones specially designed or configured for the present disclosure, or may be the one known and available to those skilled in the computer software. Examples of the computer readable medium can include a magnetic media such as a hard disk, a floppy disk, and a magnetic tape, an optical media such as a CD-ROM, a DVD, and a Blue ray, and a semiconductor storage device specially configured to store and perform a program (command) code such as a ROM, a RAM, and a flash memory.

Herein, examples of the program (command) code include a high-level language code that can be executed by a computer using an interpreter, etc., as well as a machine language code made such as those produced by a complier. The hardware device may be configured to operate as one or more software modules to perform the operation of the present disclosure, and vice versa.

What is claimed is:

1. A fuel cell failure diagnostic apparatus, comprising:
  a water-level sensor configured to sense a water-level of water generated at an anode side of a fuel cell stack and stored in a water trap;
  a drain valve for the drain control of the generated water;
  a drain valve position sensor configured to sense a closed position or an open position of the drain valve to mitigate an excessive shut-down and enhance drivability; and
  a controller configured to detect a failure situation by performing failure diagnosis based on the sensing information generated from the water-level sensor and the drain valve position sensor, and perform a corresponding control depending upon the failure situation.

2. The fuel cell failure diagnostic apparatus of claim 1, wherein the failure diagnosis is any one selected from the group consisting of: a water-level non-increased error diagnosis of the generated water, a water-level out-of-normal range diagnosis of the generated water, a drain valve opening error diagnosis, a drain valve closing error diagnosis, or a drain valve position sensor opening error diagnosis.

3. The fuel cell failure diagnostic apparatus of claim 2, wherein the water-level non-increased error diagnosis determines a failure of the water-level sensor depending upon the increase of the water-level using a first current integrated value calculated by integrating a water-level sensor value of the water-level sensor, and considers at least one of fuel cell stack temperature and fuel cell stack current when calculating the first current integrated value.

4. The fuel cell failure diagnostic apparatus of claim 3, wherein the fuel cell stack temperature is an inlet temperature or an outlet temperature of the fuel cell stack.

5. The fuel cell failure diagnostic apparatus of claim 3, wherein the water-level out-of-normal range diagnosis of the generated water determines the water-level out-of-normal range of the generated water depending on whether the water-level sensor value is less than or greater than a particular value and the first current integrated value is maintained longer than a predetermined period of time.

6. The fuel cell failure diagnostic apparatus of claim 5, wherein when the first current integrated value is a first setting integrated reference value or greater and the water-level sensor value is maintained at a first particular value or greater for a first predetermined period of time, or the water-level sensor value is a second particular value or less and the first current integrated value is maintained at a second setting integrated reference value or greater for a second predetermined period of time, the controller is configured to perform a drain control by opening the drain valve based on the second current integrated value that the water-level sensor value is integrated from upon operation of the fuel cell.

7. The fuel cell failure diagnostic apparatus of claim 2, wherein the drain valve opening error diagnosis determines a failure when the water-level of the generated water does not reduce within a predetermined period of time after a valve opening command, and the closed state on the drain valve position sensor is maintained for a predetermined period of time.

8. The fuel cell failure diagnostic apparatus of claim 7, wherein when the opening of the drain valve fails, a current restriction control, a drain operation control based on the current integrated value, and an operation temperature upward control of the fuel cell stack are performed to make operation possible while preventing the generated water from being accumulated.

9. The fuel cell failure diagnostic apparatus of claim 2, wherein the drain valve closing error diagnosis determines a failure when the water-level of the generated water is maintained at a setting reference value or less within a predetermined period of time after a valve closing command, and the opened state on the drain valve position sensor is maintained for a predetermined period of time.

10. The fuel cell failure diagnostic apparatus of claim 9, wherein when the closing of the drain valve fails, a system shut-down control is performed to prevent hydrogen leakage.

11. The fuel cell failure diagnostic apparatus of claim 2, wherein the drain valve position sensor opening error diagnosis determines a failure when the water-level reduction of the generated water is sensed, and the opened state on the drain valve position sensor is maintained during opening of the drain valve.

12. The fuel cell failure diagnostic apparatus of claim 11, wherein when the opening of the drain valve position sensor fails, the controller is configured to perform a normal operation control.

13. The fuel cell failure diagnostic apparatus of claim 11, wherein when the opening of the drain valve position sensor fails, the controller is configured to output a user alarm.

14. The fuel cell failure diagnostic apparatus of claim 11, wherein when the opening of the drain valve position sensor fails, the controller is configured to generate a failure code for maintenance separately.

15. The fuel cell failure diagnostic apparatus of claim 1, further comprising:
a hydrogen purge valve for hydrogen concentration maintenance control of the fuel cell stack,
wherein the controller is configured to perform a purge control using the drain valve when the hydrogen purge valve is not always closed or is unable be opened.

16. The fuel cell failure diagnostic apparatus of claim 1, wherein the controller is configured to increase operation temperature and perform a normal operation control when the drain valve is not always closed.

17. The fuel cell failure diagnostic apparatus of claim 1, wherein the controller is configured to perform a normal operation control when the drain valve position sensor has any one of the disconnection failure of the sensor power supply, the short-circuit failure of the sensor power supply, the disconnection failure of the sensor, and the short-circuit failure of the sensor.

18. A fuel cell failure diagnostic method, comprising:
sensing, by a water-level sensor, a water-level of water generated at an anode side of a fuel cell stack and stored in a water trap;
performing, by a drain valve, a drain control of the generated water;
sensing, by a drain valve position sensor, a closed position or an open position of the drain valve to mitigate an excessive shut-down and enhance drivability; and
detecting, by a controller, a failure situation by performing a failure diagnosis based on the sensing information generated from the water-level sensor and the drain valve position sensor, and perform a corresponding control depending upon the failure situation.

19. The fuel cell failure diagnostic method of claim 18, wherein the failure diagnosis is any one selected from the group consisting of: a water-level non-increased error diagnosis of the generated water, a water-level out-of-normal range diagnosis of the generated water, a drain valve opening error diagnosis, a drain valve closing error diagnosis, or a drain valve position sensor opening error diagnosis.

* * * * *